March 10, 1970  J. R. PETERSON  3,499,641

FLUID PRESSURE ACTUATED DIAPHRAGM WORKPIECE CLAMPING DEVICE

Filed Oct. 2, 1967

INVENTOR.
JOHN R. PETERSON
BY
ATTORNEY

United States Patent Office 3,499,641
Patented Mar. 10, 1970

3,499,641
FLUID PRESSURE ACTUATED DIAPHRAGM
WORKPIECE CLAMPING DEVICE
John R. Peterson, Garland, Tex., assignor to Collins Radio Company, Cedar Rapids, Iowa, a corporation of Iowa
Filed Oct. 2, 1967, Ser. No. 672,355
Int. Cl. B23q 3/08
U.S. Cl. 269—22                        6 Claims

ABSTRACT OF THE DISCLOSURE

A fluid pressure actuated diaphragm machine workpiece clamping device. The device is in the form of an airtight annular chamber that is expanded into the work clamping state when pressurized, and when so activated it is designed to also form a shield enclosure around the work area of a workpiece clamped in place.

---

Figure 1:
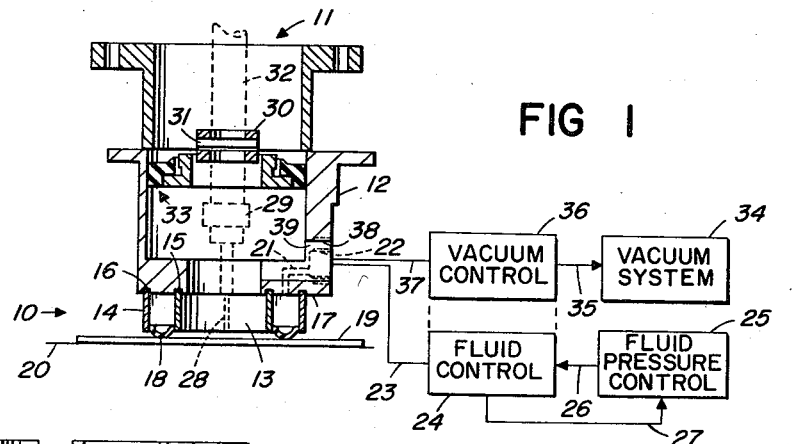

This invention relates in general to machine tool workpiece clamping, and in particular, to a fluid pressure actuated combination shield enclosure and clamping device for enclosing and holding a workpiece in place during machining.

Various problem encountered with the machining and drilling of workpieces such as circuit boards include machine chip and/or dust contamination of other circuit sections on a circuit board or other boards in the area for processing. Further, it is important that workpieces be easily and quickly inserted in place, firmly clamped in place during processing, and easily and quickly removable from the work station after machining is complete. Still further, there are times when heating during machining is a particular problem along with machine process chip and dust removal.

It is, therefore, a principal object of this invention to provide quick easy placement, firm secure clamping, and fast removal of workpieces being processed.

A further object is to provide a fluid pressure actuated clamp providing such operation shaped to be a shield encloser around the work area of a workpiece clamped in place.

Features of this invention useful in accomplishing the above objects include, in various embodiments, an airtight annular chamber formed by a backing plate, two concentric spaced sleeves and molded flexible diaphragm. A fluid pressure system is controlled for pressurizing the annular chamber and extending the flexible diaphragm into firm conforming clamping contact with a workpiece such as a circuit board mounted on the bed of a machine. While the diaphragm clamping device is activated it also forms a shield enclosure around the work area of a workpiece clamped in place. Further the shield enclosure may be subject to evacuation or flushing by fluids for cooling and/or machine chip and dust removal.

Specific embodiments representing what are presently regarded as the best modes for carrying out the invention are illustrated in the accompanying drawing.

Figure 2:
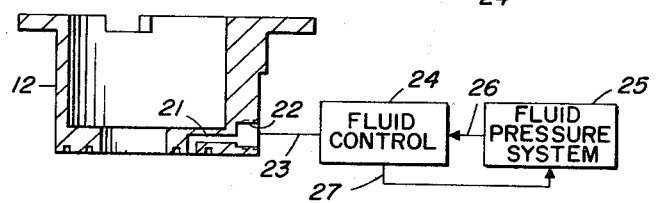
Figure 3:
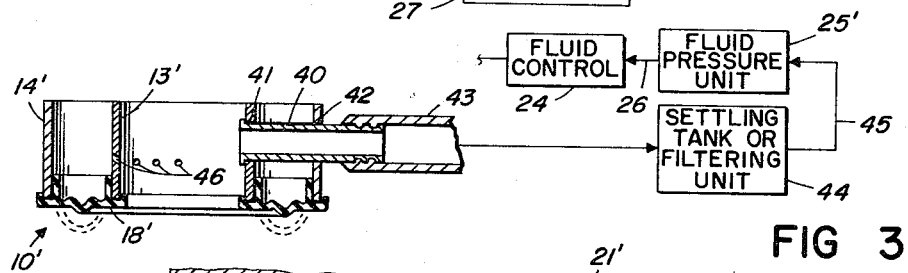

In the drawing:

FIGURE 1 represents a vertical sectional and partially detailed view of one of applicant's fluid pressure actuated diaphragm workpiece clamping devices as instaleld on a drill press;

FIGURE 2, a vertical section of the diaphragm device mounting piece rotationally displaced from the vertical section of FIGURE 1 to show pressure line port detail;

FIGURE 3, a vertical section of another diaphragm clamping device; and

Figure 4:
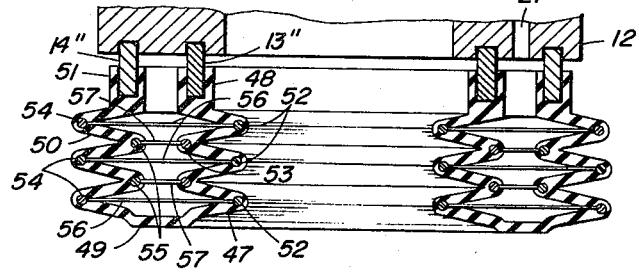
Figure 5:
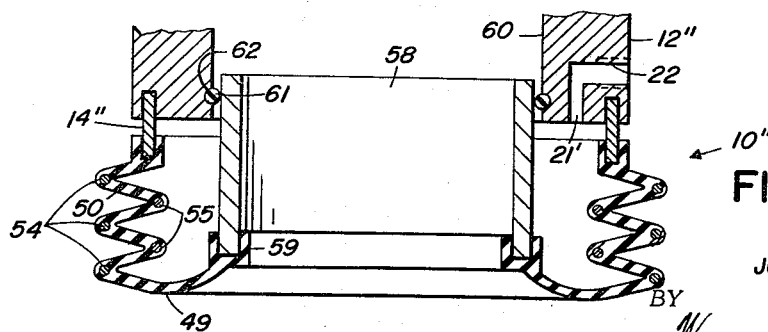

FIGURES 4 and 5, vertical sections of two bellows type diaphragm clamping devices giving increased diaphragm travel.

Referring to the drawing:

The fluid pressure actuated diaphragm workpiece clamping device 10 of FIGURE 1 is shown to be mounted in a partially shown drill press machine 11 by a diaphragm device mounting member 12 to which concentric spaced metal sleeves 13 and 14 of substantially uniform length are mounted as by pressed effectively sealed fits within annular grooves 15 and 16, respectively, in a backing plate portion 17 of the mount member 12. An annularly shaped flexible diaphragm member 18 is mounted within and extends between the lower end of the sleeves 13 and 14 with such sealant means as to effectively seal the bottom end of the chamber formed by the backing plate portion 17 of member 12 and the sleeves 13 and 14. Further, the diaphragm member 18 is so positioned that with the application of internal pressure the diaphragm will be flexed downwardly to engage a workpiece 19 such as a circuit board placed upon the machine bed surface 20. A fluid flow channel passageway 21 extends from a threaded fitting opening 22 for connection to fluid system line 23 such as illustrated schematically in FIGURE 2. Line 23 extends to a fluid control 24 that may be manually operated or operated automatically with operation of machine in accord with techniques readily known to those skilled in the art in controlling the application of pressure from fluid pressure system 25 through line 26 and on through the fluid control 24 and line 23 to the fitting opening 22 and passageway 21 to the annular enclosed chamber formed by the diaphragm device assembly 10. A fluid return line 27 provides for fluid flow back to the fluid pressure system 25 and through the line 23 and passageway 21 when so controlled by fluid control 24. This pressure system may be a pneumatic pressure system or for certain installations and to meet design criteria, or it could be liquid pressure system for actuation of the diaphragm clamping device 10.

The diaphragm workpiece clamping device 10 is so designed that when pressure actuated to the workpiece clamping position along with the workpiece and the mounting member 12 a shielded enclosure is provided above and around the work area engaged by the machining tool, in this instance a drill bit 28 indicated in phantom along with the drill bit mounting structure 29. Please note that an annular ring 30 is mounted by a pin 31 to rotate with drive shaft 32 of the drill bit mounting structure 29 and move vertically up and down with shaft 32 while still providing a sufficiently adequate closure at the top of the shielded enclosure provided by the mounting member 12 and the diaphragm device assembly 10 in combination with a seal structure assembly 33 at the top of mounting member 12. If the fluid pressure system 25 is an air pressure system control for application of the pressure with, for example, approximatley 50 p.s.i. being delivered to the chamber, the rubber diaphragm 18 extends until it contacts a workpiece such as a circuit board inserted in place with pressure application thereto substantially equalized over any irregularities of the board through flexibility of the diaphragm member 18. The diaphragm then remains in the clamping state holding the circuit board firmly in position throughout an entire drilling cycle including both drill entry and withdrawal after which pressure is controllably released from the diaphragm to thereby allow the circuit board to be moved from the machine or to another position in the machine where another cycle may be duplicated. The diaphragm may be of such resilience that with relaxation of actuating pressure it draws back of its own resilience or the air system may transform from pressure to a semivacuum to draw it loose or it may so given when actuating pressure is removed that movement of the workpiece circuit board is easy against any remaining dragging force of the diaphragm clamping surface exerted thereon. The diaphragm device assembly 10 is also provided with a fluid evacuation system 34 connected through line 35, evacuation control 36, line 37, threaded fitting opening 38, and passageway 39 extended to the interior of the member 12 and the shielded enclosure formed with the diaphragm device assembly 10 when actuated to the work clamping state. The vacuum system 34 could be continually acting for evacuation from the interior of member 12 and the interior of the diaphragm device assembly 10 or vacuum control 36 could be employed to control suction by the evacuation system to the intervals of diaphragm device assembly 10 actuation. Furthermore, the evacuation control 36 and the fluid pressure control 24 could be interlinked as indicated in FIGURE 1 by the dotted interconnecting lines such that both would be subject to activation and also on the other hand shut off simultaneously in a common controlling action.

Referring now to the embodiment of FIGURE 3, components similar in many respects to the corresponding components in the embodiment of FIGURES 1 and 2 will be given primed numbers. Components not shown are to be taken as being substantially the same and components entirely different and new are given new numbers. In this embodiment, while the mounting member 12 is not illustrated, the concentric sleeves 13' and 14' would be mounted therein in substantially the same manner as sleeves 13 and 14 in the embodiment of FIGURE 1. The diaphragm member 18' mounted at the bottom and enclosing the bottom of the enclosure formed by the sleeves 13' and 14' performs substantially the same function as the diaphragm member 18 in the embodiment of FIGURE 1 but is shaped and mounted a little bit differently as indicated by visual comparison between the two and to illustrate that a variety of diaphragm configurations may be employed at the bottom of sleeves 13 and 14 or 13' and 14'. With this embodiment, a passageway is provided from the interior of the diaphragm device assembly 10' through a tube 40 mounted in an extending through openings 41 and 42 in sleeves 13' and 14', respectively, in order that the tube provide a passageway for evacuation of the shielded enclosure in place of the threaded fitting opening 38 and passageway 39 in the mounting member 12 of the FIGURE 1 embodiment. The tube 40 extends outwardly for the mounting thereon of a fluid evacuation line 43 that may be connected to a settling tank or filtering unit 44 from which, if it is a closed system, the fluid may be drawn through line 45 in place of the line 27 in the FIGURE 1 embodiment as a return input to the fluid pressure unit 25' of the fluid system. The output of the fluid pressure unit 25' is passed through line 26 to fluid control 24 just as with the embodiment of FIGURES 1 and 2 and from the fluid control 24 to the tapped opening 22 and passageway 21 that are still utilized in this embodiment, although not shown, in substantially the same manner as employed in member 12 of the FIGURES 1 and 2 embodiment.

Please note in the embodiment of FIGURE 3 the openings 46 through the inner sleeve 13' that permit pressurized through flow of air, if pneumatic pressure is used for activation of the diaphragm clamping device 10', to facilitate machining dust and chip removal. The openings 46 may be, additionally, so directed through the sleeve 13', as shown, to most effectively direct incoming jets of air downward toward the machine action work area. Obviously these openings 46 would perform substantially the same function when a liquid is used in place of air through the fluid pressure system for actuation of the diaphragm device in clamping workpieces for machining operations not only for machining dust and chip removal but also for beneficial cooling.

Referring now to the embodiment of FIGURE 4 the mounting member 12' includes a fluid pressure passageway 21' just as passageway 21 in the embodiment of FIGURE 1, and the mounting member mounts shortened sleeves 13" and 14" in much the same manner that the sleeves 13 and 14 are mounted in member 12 in the embodiment of FIGURE 1. In this instance, however, the sleeves 13" and 14" are shortened to be essentially concentric spaced rings employed primarily for the mounting of an annular chamber bellows type clamping device 10". The bellows device 10" is formed with an inner sinuous annular wall 47 having a top sealed connective mounting 48 on ring 13" and extend to a bottom work engaging shoe diaphragm shoe portion 49. The outer portion of the bellows work clamping device 10" includes an outer sinuous annular flexible wall 50 positioned in outwardly spaced concentric relation to the inner sinuous wall 47. This outer wall 50 is mounted at its upper end by a top sealed connective mounting 51 on the outer concentric ring 14". The inner sinuous wall 47 and the outer sinuous wall 50 include annular embedded wire rings 52, 53, 54 and 55, respectively, in order to aid operational expansion and contraction of the bellows clamping device 10" with the movement confined by rings 52, 53, 54 and 55 primarily to the up and down movement of the clamping diaphragm shoe portion 49 rather than undesired lateral outward and inward movement of the sinuous walls 47 and 50. Obviously, this construction provides a much greater range of vertical clamping end movement and greater workpiece clearance than possible with the embodiments of FIGURES 1 and 3 and that may be required from time to time. As a further aid in insuring that the operational movement with the application of pressure to the clamping device 10" occurs downwardly with respect to the clamping diaphragm shoe portion 49 spacing wires 56 may be extended between outer rings 54 and the inner rings 52, and also additional shorter spacing wires 57 may be extended between the more closely spaced rings 53 and 55.

With the embodiment of FIGURE 5 those elements the same as in the somewhat similar embodiment of FIGURE 4 will be given the same numbers and those portions which are new and different will be given new numbers and the description, as a matter of convenience, will be directed primarily to the new variations in this embodiment over that of the FIGURE 4 embodiment. In the half bellows work clamping device 10''' instead of employing an inner annular sinuous wall 47, as in the FIGURE 4 embodiment, a vertically movable sleeve 58 is employed that has its bottom received in an annular sealed connection 59 in close adjacency to the bottom clamping diaphragm shoe portion 49. Sleeve 58, which is adapted and designed for vertical movement within opening 60 of the mounting member 12" with activation and deactivation of the clamping device 10''', is of such size as to be in closely spaced sliding relation to the wall of the opening 60 and is in slidable sealed relationship with respect to the wall structure so as to provide a sealed enclosure at this point relative to the interior of the half bellows clamping device 10'''. This sealing between the sleeve 58 and the wall of opening 60 in mounting member 12" is provided by an O-ring seal structure 61 retained in groove 62 of the wall of opening 60 in mounting member 12".

Whereas this invention is here illustrated and described with respect to specific embodiments thereof, it should be realized that various changes may be made without departing from the essential contributions to the art made by the teachings hereof.

I claim:
1. In a fluid pressure actuated diaphragm workpiece clamping device, a sealed clamping device chamber; passageway means for the application of actuating pressure to the sealed clamping device chamber; flexible diaphragm means forming part of said sealed clamping device chamber and formed with a workpiece engaging portion; with said sealed clamping device chamber being constructed to form a shield enclosure around the work area of a workpiece clamped in place; wherein said sealed clamping device chamber is an annularly shaped chamber forming an annular shield enclosure around the work area of a workpiece clamped in place; and, wherein said sealed clamping device chamber is formed by a backing plate, two concentric spaced sleeves, and said flexible diaphragm means; wherein the backing plate is part of a mounting member; the two concentric spaced sleeves are mounted in the backing plate portion of said mounting member; said flexible diaphragm means is mounted on and spans the space between the ends of said sleeves remote from the mountings of said two concentric spaced sleeves in the mounting member; and said passageway means includes opening means in said mounting member extending to the surface of the backing plate portion between said sleeves.

2. The fluid pressure actuated diaphragm workpiece clamping device of claim 1, also including fluid flow input means to said annular shield enclosure; and fluid evacuations means from said annular shield enclosure.

3. The fluid pressure actuated diaphragms workpiece clamping device of claim 2, wherein said fluid evacuation means includes evacuation passageway means extending from a portion of said mounting member to the exterior of the device.

4. The fluid pressure actuated diaphragm workpiece clamping device of claim 2, wherein evacuation duct means is extended through both said sleeves.

5. The fluid pressure actuated diaphragm workpiece clamping device of claim 2 wherein said fluid flow input means to said annular shield enclosure includes opening means in the innermost of said concentric sleeves.

6. In a fluid pressure actuated diaphragm workpiece clamping device, a sealed clamping device chamber; passageway means for the application of actuating pressure to the sealed clamping device chamber; flexible diaphragm means forming part of said sealed clamping device chamber and formed with a workpiece engaging portion; with said sealed clamping device chamber being constructed to form a shield enclosure around the work area of a workpiece clamped in place; wherein said sealed clamping device chamber is an annularly shaped chamber forming an annular shield enclosure around the work area of a workpiece clamped in place; and wherein said sealed clamping device chamber is formed by a backing plate, two concentric spaced sleeves, and said flexible diaphragm means; said flexible diaphragm means is a sinuous walled bellows type structure; said backing plate includes an opening in which the innermost of said concentric sleeves is a sliding fit; and including seal means between said innermost sleeve and the backing plate.

References Cited
UNITED STATES PATENTS

| | | | |
|---|---|---|---|
| 2,420,905 | 5/1947 | Olsen | 77—55 |
| 2,867,324 | 1/1959 | Hirs | 269—22 X |
| 3,033,298 | 5/1962 | Johnson | 175—209 |

ROBERT C. RIORDON, Primary Examiner

U.S. Cl. X.R.
77—63; 175—209